US007021693B2

(12) United States Patent
Keller (10) Patent No.: US 7,021,693 B2
(45) Date of Patent: Apr. 4, 2006

(54) PICKUP BED COVER (76) Inventor: William Bruce Keller, 2214 Chisholm Dr., Duncan, OK (US) 73533

( * ) Notice: Subject to any disclaimer, the term of this patent is extended or adjusted under 35 U.S.C. 154(b) by 0 days.

(21) Appl. No.: 11/140,108

(22) Filed: May 27, 2005

(65) Prior Publication Data

US 2006/0012211 A1 Jan. 19, 2006

Related U.S. Application Data (63) Continuation-in-part of application No. 10/891,398, filed on Jul. 14, 2004, now Pat. No. 6,899,372.

(51) Int. Cl.
*B60P 7/02* (2006.01)

(52) U.S. Cl. ............... 296/100.09; 296/100.06; 296/100.1

(58) Field of Classification Search ........... 296/100.06, 296/100.07, 100.09, 100.1; 160/32, 35, 84.01, 160/84.02, 84.03, 84.08
See application file for complete search history.

(56) References Cited

U.S. PATENT DOCUMENTS

| 3,936,077 | A |   | 2/1976  | Bliek           |            |
|-----------|---|---|---------|-----------------|------------|
| 4,252,362 | A |   | 2/1981  | Campbell        |            |
| 4,273,377 | A |   | 6/1981  | Alexander       |            |
| 4,313,636 | A | * | 2/1982  | Deeds           | 296/100.09 |
| 4,418,954 | A |   | 12/1983 | Buckley         |            |
| 4,546,877 | A |   | 10/1985 | Evans           |            |
| 4,639,033 | A |   | 1/1987  | Wheatley et al. |            |
| 4,647,103 | A |   | 3/1987  | Walblay         |            |
| 4,844,531 | A |   | 7/1989  | Kooiker         |            |
| 4,946,217 | A |   | 8/1990  | Steffens et al. |            |
| 5,087,093 | A |   | 2/1992  | Repetti         |            |
| 5,293,711 | A |   | 3/1994  | Robinson        |            |
| 5,427,428 | A |   | 6/1995  | Ericson et al.  |            |
| 6,234,559 | B1| * | 5/2001  | Block et al.    | 296/100.06 |
| 6,408,564 | B1|   | 6/2002  | Murphy          |            |
| 6,533,344 | B1|   | 3/2003  | Patterson       |            |
| 6,588,825 | B1| * | 7/2003  | Wheatley        | 296/100.01 |
| 6,616,210 | B1| * | 9/2003  | Massey          | 296/100.1  |
| 6,824,190 | B1| * | 11/2004 | Rogers          | 296/100.09 |
| 6,899,372 | B1| * | 5/2005  | Keller          | 296/100.09 |

* cited by examiner

*Primary Examiner*—Stephen Gordon
(74) *Attorney, Agent, or Firm*—Exclusivity-Law, Inc.; James T. Robinson

(57) ABSTRACT

A cover for the bed of a pickup truck provides a front rigid panel fastened to the front wall of the pickup bed, at least one intermediate rigid panel attached to the front rigid panel by a first transverse hinge, and a rear rigid panel attached to the intermediate rigid panel by a second transverse hinge. The rear rigid panel has a tailgate locking lip flaring downwardly and outwardly to prevent the tailgate from opening. In the fully covering position, the pickup bed cover provides a water-resistant, locked cargo area. In the partially covering position, the rear rigid panel and, optionally, the intermediate rigid panel fold forward to permit access to the cargo bed. Another pickup bed cover according to the applicant's invention provides a frontmost rigid panel fastened to a toolbox mounted in the pickup bed, at least one intermediate rigid panel attached to the front rigid panel by a first transverse hinge, and a rearmost rigid panel attached to the intermediate rigid panel by a second transverse hinge.

5 Claims, 10 Drawing Sheets

PICKUP BED COVER

This application is a continuation-in-part of application Ser. No. 10/891,398 filed Jul. 14, 2004, for which application U.S. Pat. No. 6,899,372 issued on May 31, 2005.

BACKGROUND OF THE INVENTION

1. Field of the Invention

This invention relates to pickup bed covers and the like and, more particularly, to a multi-section folding pickup bed cover which is capable of being partially opened to permit use of some or all of the pickup bed. The cover is sufficiently rigid to support at least 100 pounds on top of the cover without bending. When unfolded to cover the entire pickup bed, locks engage the rearmost stake pockets in the pickup bed side rails. The cover folds against the pickup cab to permit use of the entire pickup bed.

Pickups with open beds experience reduced fuel economy due the drag created by the tailgate and the open bed generally. Like other pickup bed covers in the prior art, the pickup bed cover according to the present invention improves fuel economy.

2. Discussion

Pickup trucks are used for business and pleasure. Trucks may haul merchandise during business hours and camping equipment on weekends. It is sometimes necessary to transport cargo under cover, while at the same time transporting cargo which extends upward past the side rails of the pickup bed.

In the prior art, pickup beds have been covered by a tonneau type cover which is formed of cloth or synthetic material and attached to the sidewall of the pickup bed by snaps. The tonneau type cover can be rolled up in the manner of a window blind or folded into a series of pleats. The tonneau type cover, although widely used, can be easily removed and does not prevent access to the bed. Moreover, installation of the tonneau cover requires drilling of the sidewall for installation of the snaps. The tonneau type cover is not capable of supporting substantial weight on top of the cover.

U.S. Pat. No. 4,252,362, Campbell, discloses a pickup bed cover characterized by a multi-channeled track having a first pair of parallel rails leading out of a storage area horizontally along the ends thereof down to the floor of the bed. A rollable or otherwise storable fabric or slatted canopy is drawn from the storage area across the parallel rails. The storage area uses valuable cargo space, and the fabric cover cannot support substantial weight.

The pickup bed cover of the present invention provides secure storage area and improved fuel economy when deployed in a position to fully cover the pickup bed. In addition, the pickup bed cover of the present invention provides the convenience of use of some or all of the pickup bed for transporting cargo which does not fit in the fully covered bed.

SUMMARY OF THE INVENTION

A cover for the bed of a pickup truck provides a front rigid panel fastened to the front wall of the pickup bed, at least one intermediate rigid panel attached to the front rigid panel by a first transverse hinge, and a rear rigid panel attached to the intermediate rigid panel by a second transverse hinge. Another pickup bed cover according to the applicant's invention provides a frontmost rigid panel fastened to a toolbox mounted in the pickup bed, at least one intermediate rigid panel attached to the front rigid panel by a first transverse hinge, and a rearmost rigid panel attached to the intermediate rigid panel by a second transverse hinge. The rear rigid panel has a tailgate locking lip flaring downwardly and outwardly to prevent the tailgate from opening. In the fully covering position, the pickup bed cover provides a water-resistant, locked cargo area. In the partially covering position, the rear rigid panel and, optionally, the intermediate rigid panel fold forward to permit access to the cargo bed.

An object of the present invention is to provide a pickup bed cover which can be folded forward toward the cab to provide either partial or full access to the pickup bed.

Yet another object of the present invention is to provide a pickup bed cover whose rigid panels will support at least 100 pounds without bending or deforming.

An object of the present invention is to provide a pickup bed cover which can be folded forward toward the toolbox to provide either partial or full access to the pickup bed.

Other objects, features, and advantages of the present invention will become clear from the following description of the preferred embodiment when read in conjunction with the accompanying drawings and appended claims.

DETAILED DESCRIPTION OF THE INVENTION

In the following description of the invention, like numerals and characters designate like elements throughout the figures of the drawings.

Figure 1:
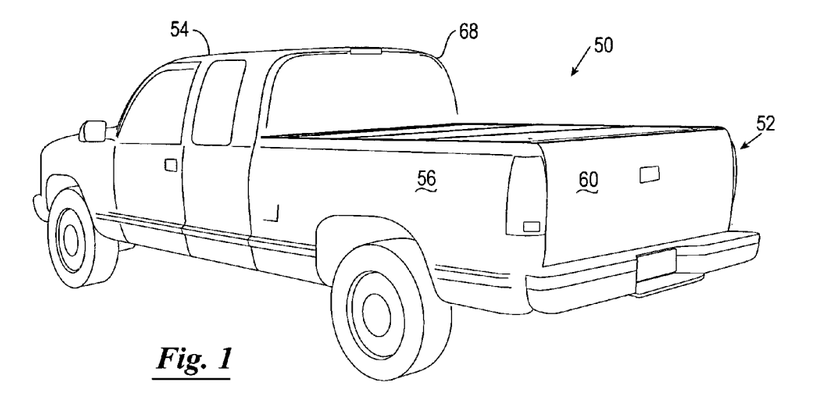
FIG. 1 is a view of applicant's pickup bed cover according to the present invention installed on a short-bed pickup.
Figure 2:
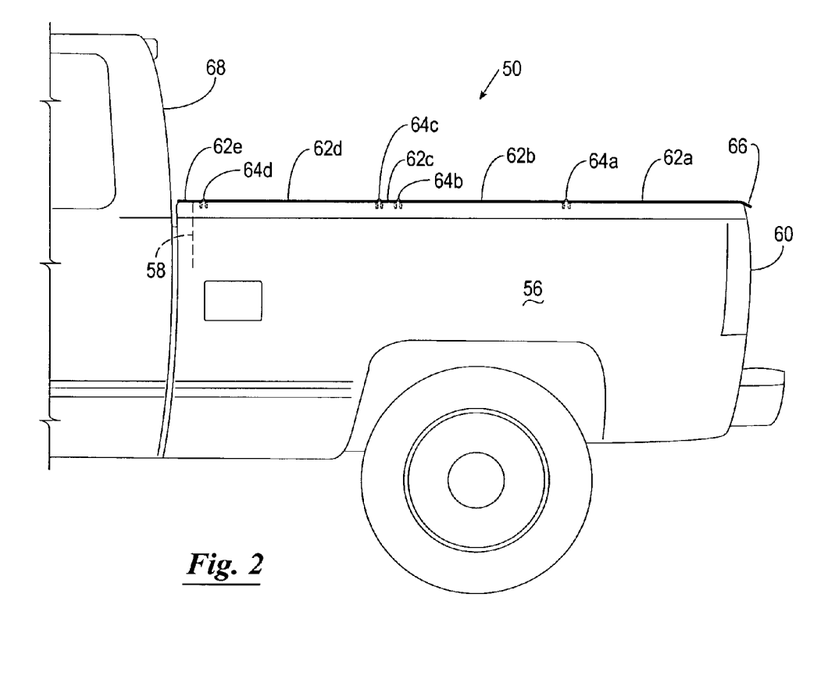
FIG. 2 is a side view of the pickup bed cover shown in FIG. 1.

Referring generally to the drawings and more particularly to FIGS. 1 and 2, a folding pickup bed cover 50 in accordance with the present invention covers the bed 52 of a pickup 54. The bed 52 of the pickup truck includes sidewalls 56, a front wall 58, and a rear wall 60. The rear wall 60 is a tailgate.

The pickup bed cover 50 is formed by substantially rigid panels 62a, 62b, 62c, 62d, and 62e which extend transversely across the pickup truck bed 52. The rigid panels are also referred to herein as rigid sections. The rigid panels are hinged together by hinges 64a, 64b, 64c, and 64d. The rearmost rigid panel 62a includes a tailgate locking lip 66 which flares downwardly and outwardly along the tailgate 60 to prevent the tailgate 60 from opening when the cover 50 is locked in the closed position illustrated in FIGS. 1 and 2. The frontmost rigid panel 62e is attached to the front wall 58 of the pickup bed 52 adjacent the cab 68 (See FIG. 6). The rigid panels can be formed from aluminum, stainless steel, or other suitable material. The rigid panel 62c is sometimes referred to as a double-hinge panel.

Figure 3:
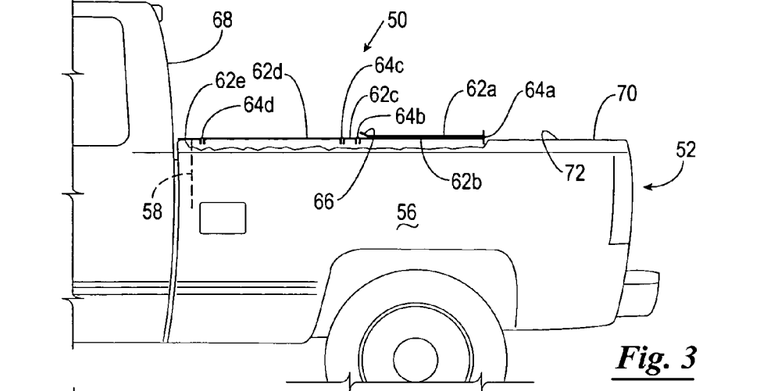
FIG. 3 is a side view of the pickup bed cover shown in FIG. 1 wherein a rear section of the pickup bed cover has been folded forward across an intermediate section to permit access to the portion of the pickup bed near the tailgate.
Figure 4:
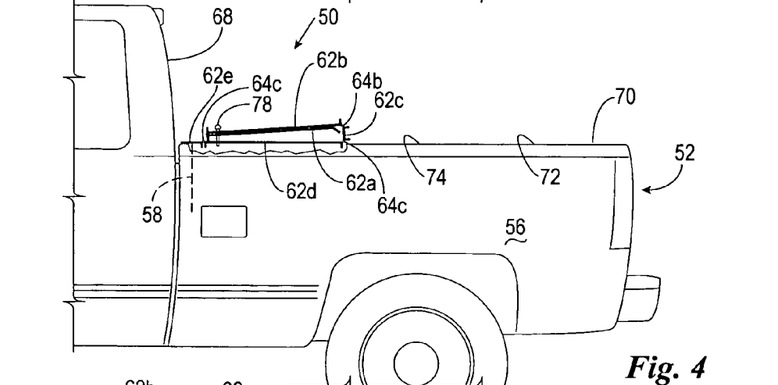
FIG. 4 is a side view of the pickup bed cover shown in FIG. 1 wherein the rear section and the intermediate section have been folded forward across a front section to permit access to the rearmost approximately two-thirds of the pickup bed.
Figure 5:
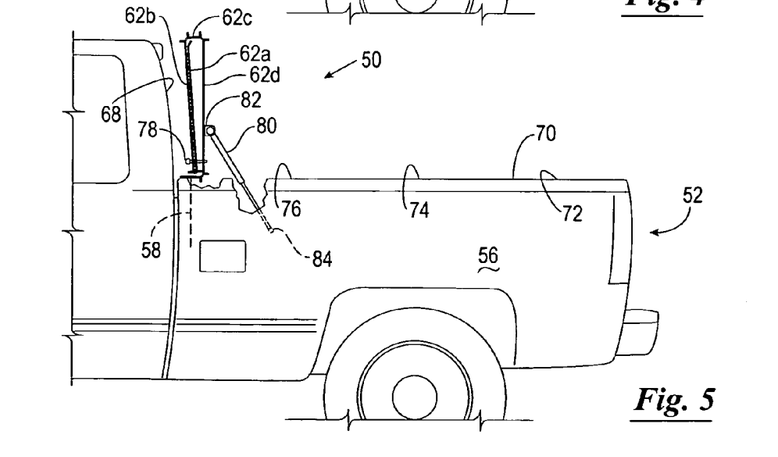
FIG. 5 is a side view of the pickup bed cover shown in FIG. 1 wherein the rear section, the intermediate section, and the front section have been folded forward against the back of the cab to permit access to the entire pickup bed.

Referring now to FIGS. 3–5, the pickup bed cover 50 is shown in progressively folded configurations. In FIG. 3, the rearmost rigid panel 62a is folded along the hinge 64a so the rigid panel 62a rests atop the rigid panel 62b and the top rear portion of the left side rail 70 of the sidewall 18 is exposed. With rigid panel 62a folded over rigid panel 62b, a rear portion 72 of the pickup bed 52 is open. The folding of rigid panel 62a over rigid panel 62b along the hinge 64a is shown in detail in FIG. 12.

Referring now to FIG. 4, the pickup bed cover 50 is folded along hinges 64b and 64c so the rearmost rigid panel is disposed between the rigid panel 62b and the rigid panel 62d. The rigid panel 62c is substantially vertical. With the rigid panels 62a, 62b, and 62c folded forward as shown in FIG. 4, both the rear portion 72 and the intermediate portion 74 of the pickup bed 52 are accessible. The folded configuration of the pickup bed cover 50 as represented by FIG. 4 is shown in detail in FIG. 13.

Referring now to FIG. 5, the pickup bed cover 50 is folded forward once again along the hinge 64d so rigid panels 62a, 62b, 62c, and 62d are adjacent the cab 68 and supported by the frontmost rigid panel 62e. With the rigid panels 62a, 62b, 62c, and 62d folded forward as shown in FIG. 5, the rear portion 72, the intermediate portion 74, and the front portion 76 of the pickup bed 52 are accessible. The folded configuration of the pickup bed cover 50 as represented by FIG. 4 is shown in detail in FIG. 14.

Referring now to FIGS. 4 and 5, a latch pin 78 extends through mating bores in rigid panels 62a, 62b, and 62d to maintain the pancake-style stack of rigid panels in a tight bundle. As shown in FIG. 5, a support 80 is attached to a support connection 82 on rigid panel 62d and to a convenient attachment point 84 on the inside of the side rail 70. The latch pin 78 and the support 80 are shown in greater detail in FIGS. 13 and 14.

Figures 6, 7, 8:
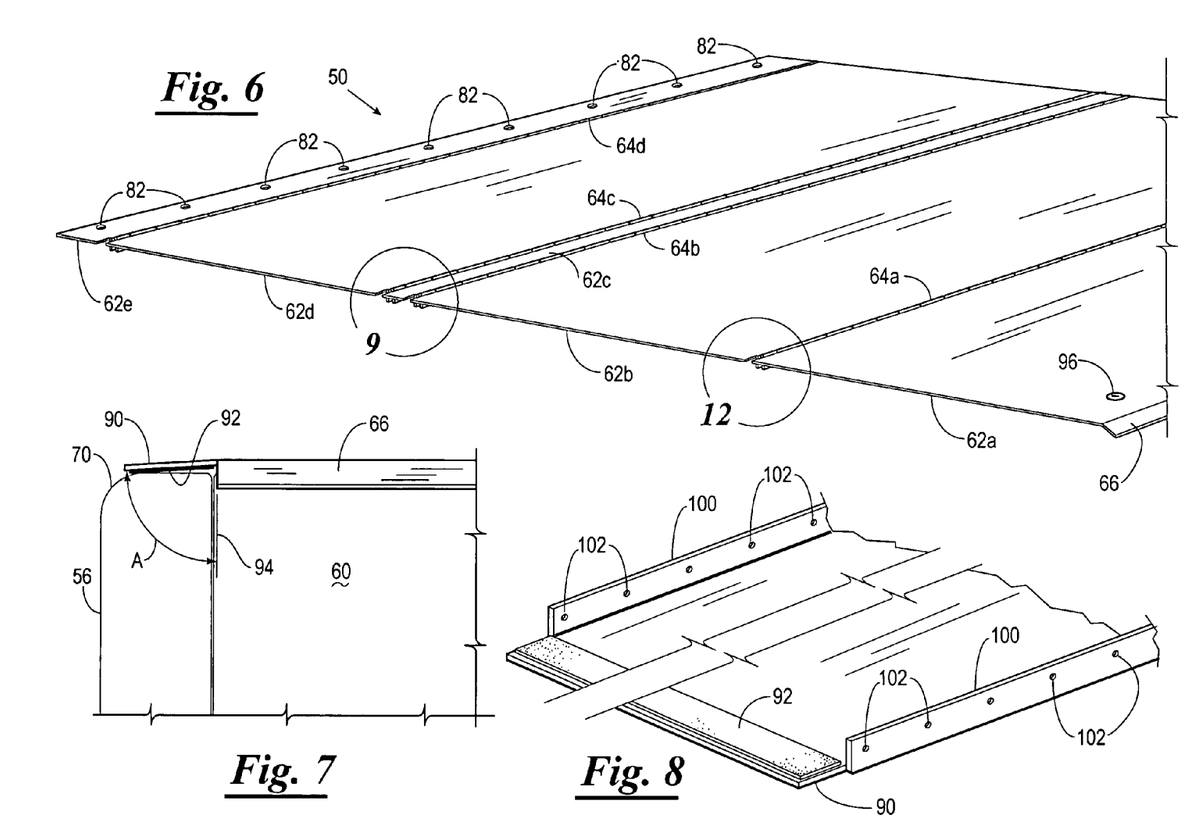
FIG. 6 is an enlarged view of the pickup bed cover shown in FIGS. 1–5.
FIG. 7 is a detailed view of the pickup bed cover shown in FIGS. 1–5, wherein a lateral extension of the pickup bed cover is shown in conjunction with the pickup rail and a locking lip portion of the pickup bed cover extends downwardly to the rear of the tailgate.
FIG. 8 is a view, partially cut away, of the underside of a section of the pickup bed cover shown in FIGS. 1–5.

Referring now to FIG. 6, the rearmost rigid panel 62a is foldably attached to the rigid panel 62b by the hinge 64a. The rigid panel 62b is foldably attached to the rigid panel 62c by the hinge 64b. The rigid panel 62c is foldably attached to the rigid panel 62d by the hinge 64c. The rigid panel 62d is foldably attached to the rigid panel 62e by the hinge 64c. The rigid panel 62f includes bores 82. The bores 82 in the frontmost rigid panel 62f permit attachment of the frontmost rigid panel 62f to the front wall 58 of the pickup bed 52. In the presently preferred embodiment, the hinges 64a, 64b, 64c, and 64d are of the type commonly referred to as piano hinges. A rotary lock 96 secures each corner of the rearmost rigid panel 62a to the rear stake pocket in each side rail 70.

Referring now to FIG. 7, each rigid panel 62a, 62b, 62c, 62d, and 62e includes, on each side where the panel contacts the side wall 56, a lateral extension 90. The lateral extension 90 extends outwardly across the side rail 70 of the side wall 56. A lateral extension seal 92 extends along the length of each side rail 70 beneath the lateral extension 90 of each rigid panel. The lateral extension seal 92 prevents rubbing of the lateral extension 90 against the side rails 70, deters water and other substances from entering the pickup bed 52 when the cover 50 is deployed as illustrated in FIGS. 1 and 2, and contributes to sound reduction. The lateral extension 90 flares downwardly from the main portion of the rigid panel to form an angle A of about 87 degrees with respect to a vertical reference line 94.

Referring now to FIG. 8, each rigid panel 62a, 62b, 62c, 62d, and 62e includes at least one hinge lip 100 for attachment of the hinges to adjacent rigid panels. The hinge lip 100 includes a series of bores 102 for attachment of the piano hinges.

Figure 9:
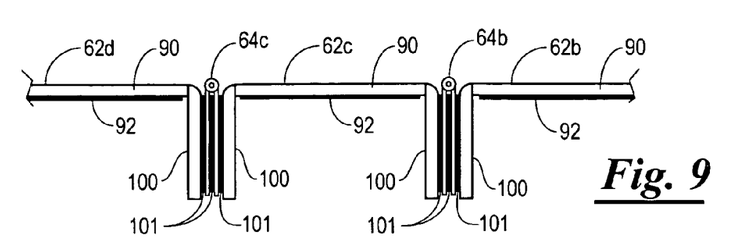
FIG. 9 is an enlarged side view of a double hinge panel shown in FIG. 6.
Figure 10:
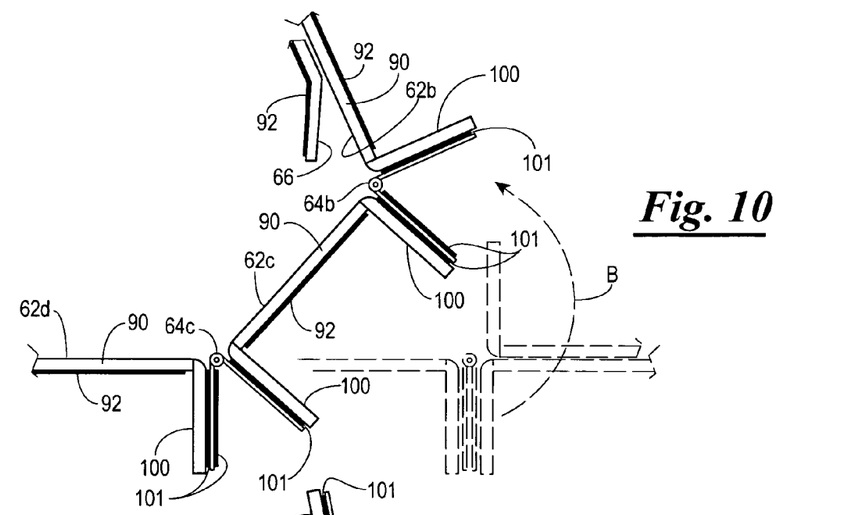
FIG. 10 is another view of the double hinge panel shown in FIGS. 6 and 9 illustrating the of the rear section and the intermediate section forward across the front section.
Figure 11:
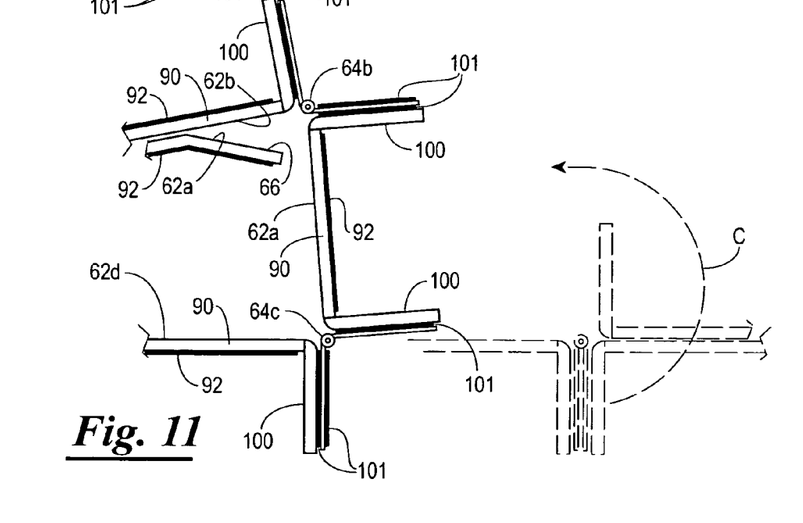
FIG. 11 is another view of the double hinge panel shown in FIGS. 6, 9, and 10 further illustrating the folding of the rear section and the intermediate section forward across the front section.

Referring now to FIGS. 9–11, the lip 100 of rigid panel 62b is attached to one lip 100 of rigid panel 62c by hinge 64b. A hinge seal 101 is disposed between the lip 100 of the rigid panel 62b and the adjacent hinge element of the hinge 64b. Another hinge seal 101 is disposed between the lip 100 of the rigid panel 62c and the adjacent hinge element of the hinge 64b. Another hinge seal 101 is adhesively attached to one of the hinge elements of the hinge 64b so as to provide a seal between the hinge elements. A second lip 100 of the rigid panel 62c is attached to a lip 100 of the adjacent rigid panel 62d by the hinge 64c. Three hinge seals 101 promote water resistance and reduce vibration and noise.

In FIG. 9, the pickup bed cover 50 is shown in a horizontal position, i.e., wherein the pickup bed cover 50 covers the bed entirely as shown in FIGS. 1, 2, and 6.

In FIG. 10, the pickup bed cover 50 is shown in an intermediate position between the configuration shown in FIG. 2 and the configuration shown in FIG. 4. An arrow B shows the direction of folding of the rigid panel 62b in counterclockwise fashion at the hinge 64*b*. An arrow C shows the direction of folding of the rigid panel 62*c* in counterclockwise fashion at the hinge 64*c*.

In FIG. 11, the rigid panels 62*a* and 62*b* are lying generally horizontally across the rigid panel 62*d*. Rigid panel 62*c*, which is hingedly connected between rigid panel 62*b* and rigid panel 62*b* is in a substantially vertical position.

Figures 12, 13:
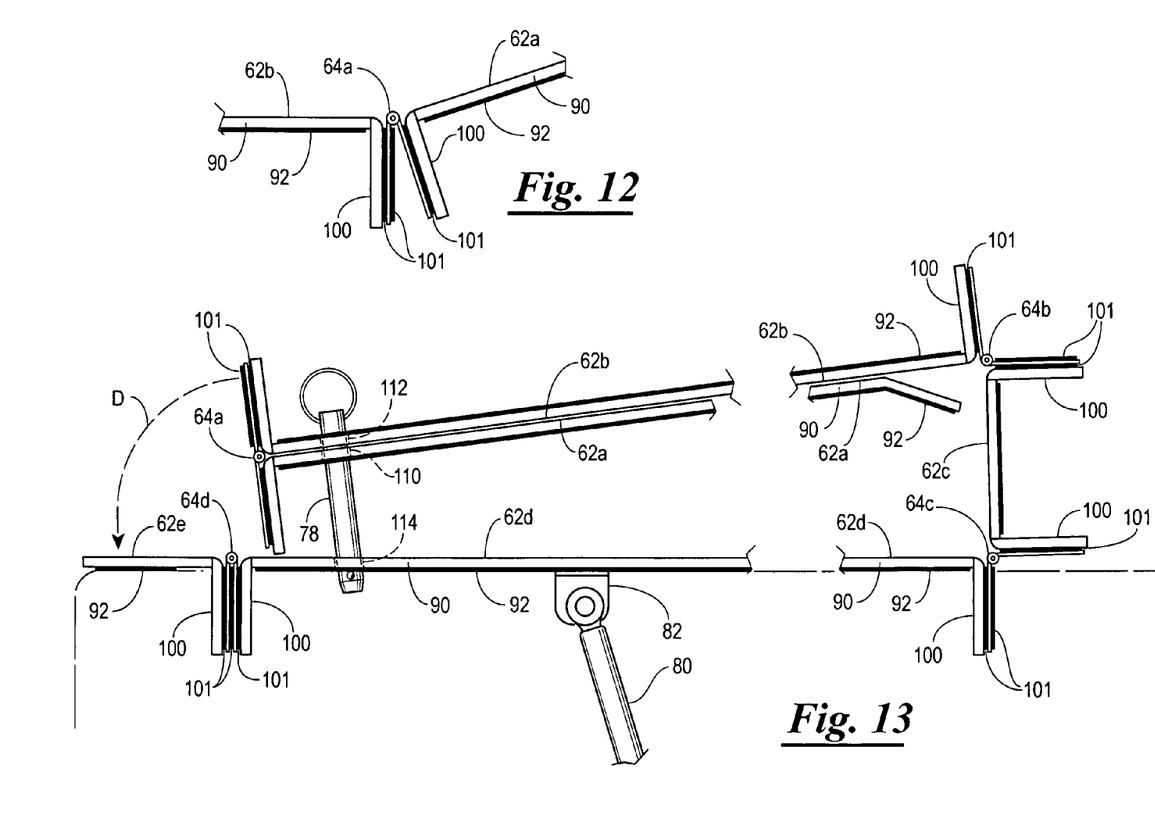
FIG. 12 is side view showing the attachment of the rear section to the intermediate section in FIG. 6.
FIG. 13 is a detailed enlarged view of the pickup bed cover shown in FIG. 4.

Referring now to FIG. 12, the rigid panel 62*a* folds across rigid panel 62*b* at hinge 64*a* to accomplish a change from the configuration shown in FIG. 2 to the configuration shown in FIG. 3.

In FIG. 13, the pickup bed cover 50 according to the present invention is configured as shown in FIG. 4. The latch pin 78 is disposed through mating bores 110, 112, and 114 in rigid panels 62*a*, 62*b*, and 62*d*, respectively. When the latch pin 78 is in place as shown in FIG. 13, the rigid panels 62*a*, 62*b*, 62*c*, and 62*d* are fixedly attached and move together along arrow D to achieve the configuration shown in FIGS. 5 and 14. As the rigid panel 62*d* folds upwardly at the hinge 64*d*, the support 80 extends and further stabilizes the pickup bed cover 50 in a vertical position against the cab 68 (See FIGS. 5 and 14).

It will be understood by one skilled in the art that the support 80 can be pneumatic, hydraulic, or mechanical. Pneumatic and hydraulic supports are well known in the art for hatchbacks, trunks, and hoods of various vehicles. Because they are well known in the art, it is not necessary to explain their operation except as it relates to the present invention.

Figure 14:
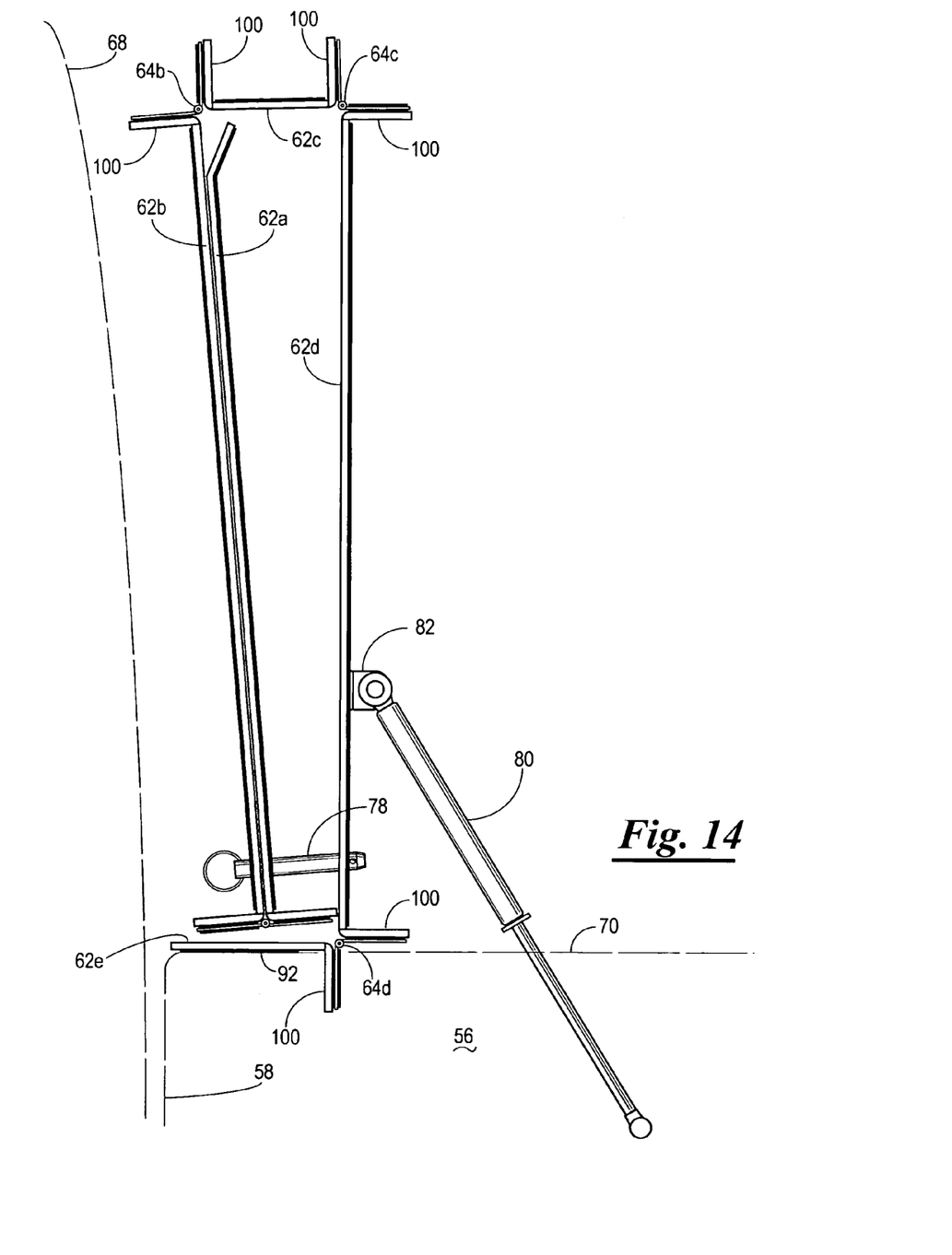
FIG. 14 is a detailed enlarged view of the pickup bed cover shown in FIG. 5.

Referring now to FIG. 14, the pickup bed cover 50 is shown in a fully folded position as in FIG. 5. The latch pin 78 holds rigid panels 62*a*, 62*b*, 62*c*, and 62*d* in fixed relationship. The support 80 holds the combination of panels 62*a*, 62*b*, 62*c*, and 62*d* in an essentially vertical position against the cab 58 of the pickup 54.

Figure 15:
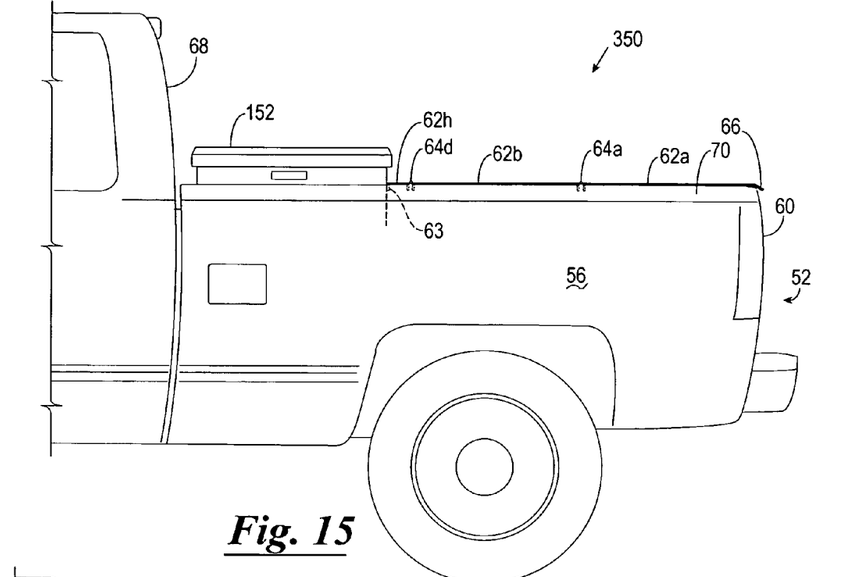
FIG. 15 is a view of a pickup bed cover according to the present invention used in conjunction with a tool box in a short-bed pickup.

Referring now to FIG. 15, a shorter pickup bed cover 350 is shown covering a portion of the pickup bed 52 of a short-bed pickup wherein a toolbox 152 has been mounted. The rearmost rigid panel 62*a* folds across the rigid panel 64*b*. The rigid panel 62*b* is foldably attached to a frontmost rigid panel 62*h* by hinge 64*d*. The frontmost rigid panel 62*h* includes a substantially vertical lip 63 (See FIG. 20). Bores 83 (not shown) in the substantially vertical lip 63 permit attachment of the frontmost rigid panel 62*h* to the toolbox 152. The combination of rigid panels 62*a* and 62*b*, held in fixed relationship by a latch pin 78 (See FIGS. 4, 5, 13, and 14), then swings counterclockwise around the hinge 64*d* to a vertical position behind the tool box 152 (See FIGS. 13 and 14).

Figure 16:
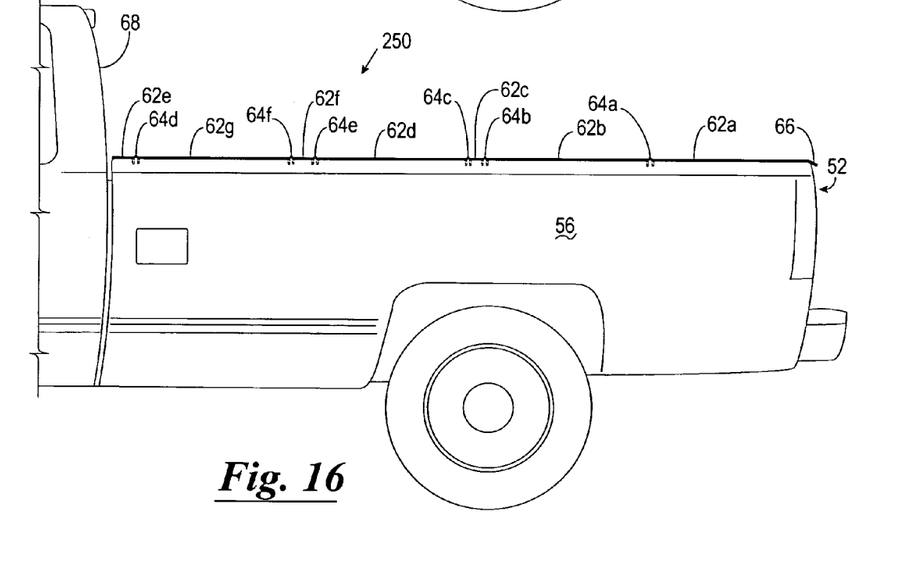
FIG. 16 is a view of a pickup bed cover according to the present invention installed on a long-bed pickup.

Referring now to FIG. 16, a pickup bed cover 250 according to the present invention is formed by substantially rigid panels 62*a*, 62*b*, 62*c*, 62*d*, 62*e*, 62*f*, and 62*g* which extend transversely across the pickup truck bed 52. The rigid panels are hinged together by hinges 64*a*, 64*b*, 64*c*, 64*d*, 64*e*, and 64*f*. The rearmost rigid panel 62*a* includes a tailgate locking lip 66 which flares downwardly and outwardly along the tailgate 60 to prevent the tailgate 60 from opening when the cover 250 is locked in the closed position illustrated in FIGS. 1 and 2. The frontmost rigid panel 62*e* is attached to the front wall 58 of the pickup bed 52 adjacent the cab 68 (See FIG. 6). The rigid panel 62*f* is a second double-hinge panel. Like double-hinge panel 62*c*, the double-hinge panel 62*f* accommodates folding of multiple layers of rigid panels in pancake fashion.

According to the present invention, the only alterations to the pickup bed 52 are the holes in the front wall 58 for attachment of the front rigid panel 62*e*, together with a point of attachment of the support 80 in one side wall 56.

Figure 17:
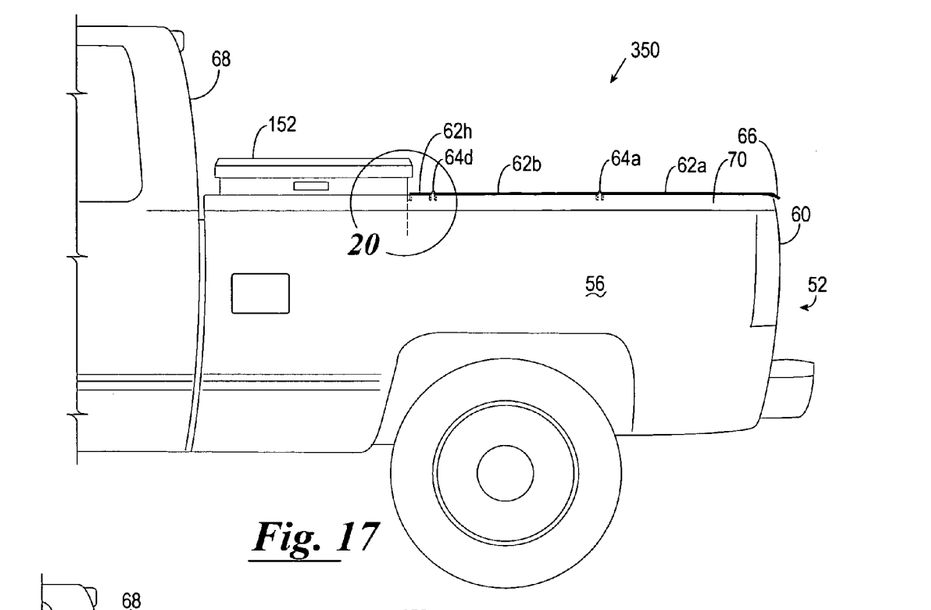
FIG. 17, similar to FIG. 15, is a view of a pickup bed cover according to the present invention attached to a tool box in a short-bed pickup.

Referring now to FIG. 17, (similar to FIG. 15 with a callout to FIG. 20) a pickup bed cover 350 is shown covering the pickup bed 52 of a short-bed pickup where a toolbox 152 has been mounted. The rearmost rigid panel 62*a* is foldably attached to the rigid panel 62*b* by hinge 64*a*. The rigid panel 62*b* is foldably attached to the rigid panel 62*h* by hinge 64*d*. The frontmost rigid panel 62*h* includes a substantially vertical lip 63 (See FIG. 20). Bores 83 in the substantially vertical lip 63 of the frontmost rigid panel 62*h* permit attachment of the frontmost rigid panel 62*h* to the toolbox 152. The combination of rigid panels 62*a* and 62*b* is held in fixed relationship by a latch pin 78 (See FIGS. 4, 5, 13, and 14), then swings counterclockwise around the hinge 64*d* to a vertical position behind the tool box 152.

Figure 18:
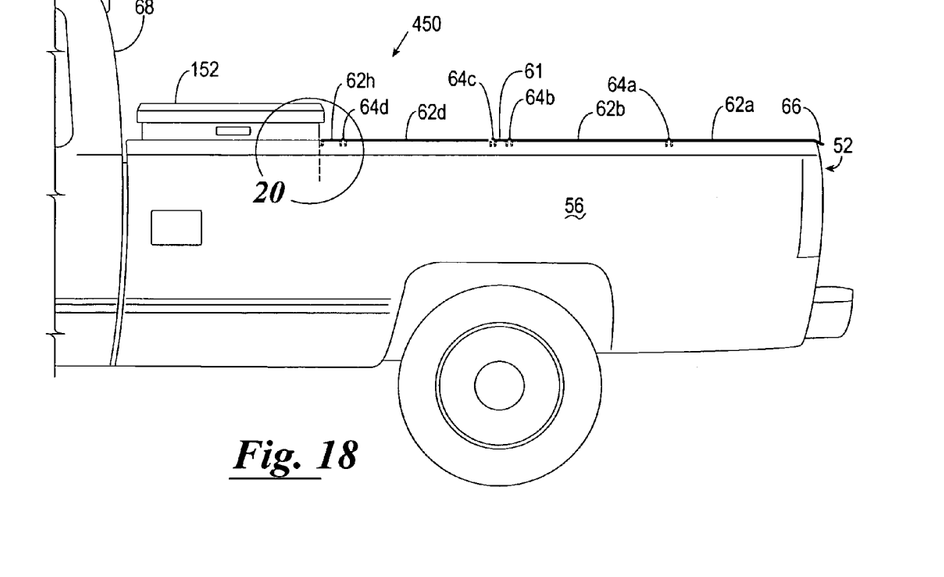
FIG. 18 is a view of a pickup bed cover according to the present invention attached to a tool box in a long-bed pickup.

Now referring to FIG. 18, a pickup bed cover 450 is shown covering the pickup bed 52 of a long-bed pickup wherein a toolbox 152 has been mounted. The rearmost rigid panel 62*a* is foldably attached to the rigid panel 62*b* by the hinge 64*a*. The rigid panel 62*b* is foldably attached to a relatively narrower rigid panel 61 by the hinge 64*b*. Relatively narrower rigid panel 61 is foldably attached to the rigid panel 62*d* by the hinge 64*c*. The rigid panel 62*d* is foldably attached to the rigid panel 62*h* by the hinge 64*d*. The rigid panel 62*h* includes a substantially vertical lip 63 (See FIG. 20). Bores 83 in the substantially vertical lip 63 of the frontmost rigid panel 62*h* permit attachment of the frontmost rigid panel 62*h* to the toolbox 152.

Figure 19:
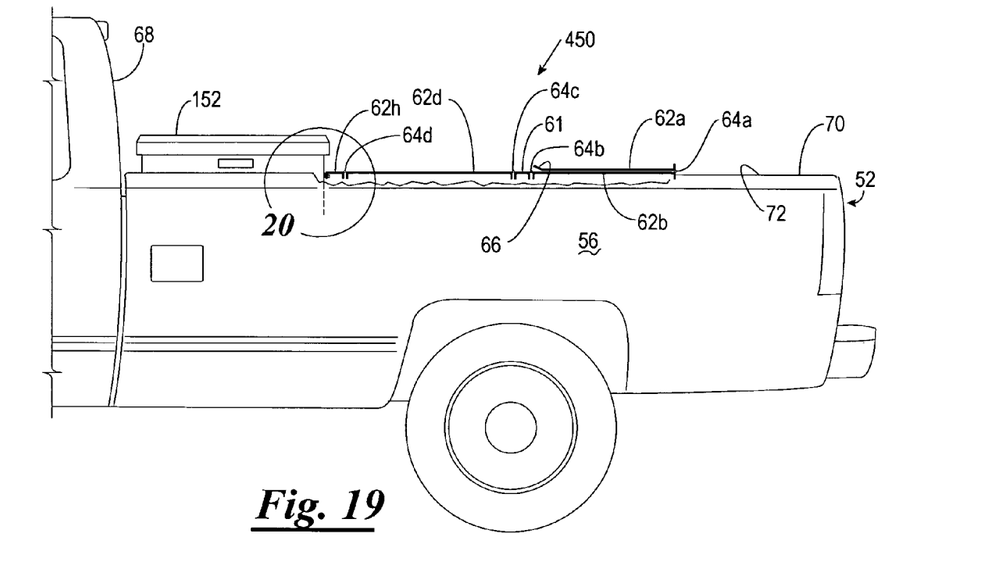
FIG. 19 is a side view of the pickup bed cover shown in FIG. 18 wherein a rear section of the pickup bed cover has been folded forward across an intermediate section to permit access to the portion of the pickup bed near the tailgate.

Now referring to FIG. 19, the pickup bed cover 450 is shown covering a portion of a pickup bed 52 of the long-bed pickup wherein the toolbox 152 has been mounted. The rearmost rigid panel 62*a* is folded along the hinge 64*a* so the rigid panel 62*a* rests atop the rigid panel 62*b* and the top rear portion of the left side rail 70 of the sidewall 18 is exposed. With rigid panel 62*a* folded over rigid panel 62*b*, the rear portion 72 of the pickup bed 52 is open. The folding of rigid panel 62*a* over rigid panel 62*b* along the hinge 64*a* is shown in detail in FIG. 12.

Figure 20:
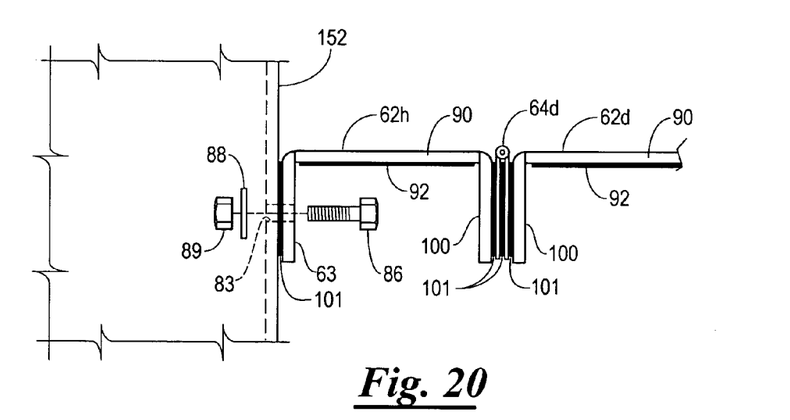
FIG. 20 is an enlarged detail showing the attachment of the pickup bed cover to the toolbox shown in FIGS. 17, 18 and 19.

Now referring to FIG. 20, the rigid panel 62*d* is foldably attached to the frontmost rigid panel 62*h* by the hinge 64*d*. The frontmost rigid panel 62*h* includes the substantially vertical lip 63. Bores 83 permit bolts 86, washers 88, and nuts 89 to attach the frontmost rigid panel 62*h* to the toolbox 152. The seal 101 is adhesively attached between the substantially vertical lip 63 of the frontmost rigid panel 62*h* and the toolbox 152. The seal 101 promotes water resistance and reduces vibration and noise.

Figure 21:
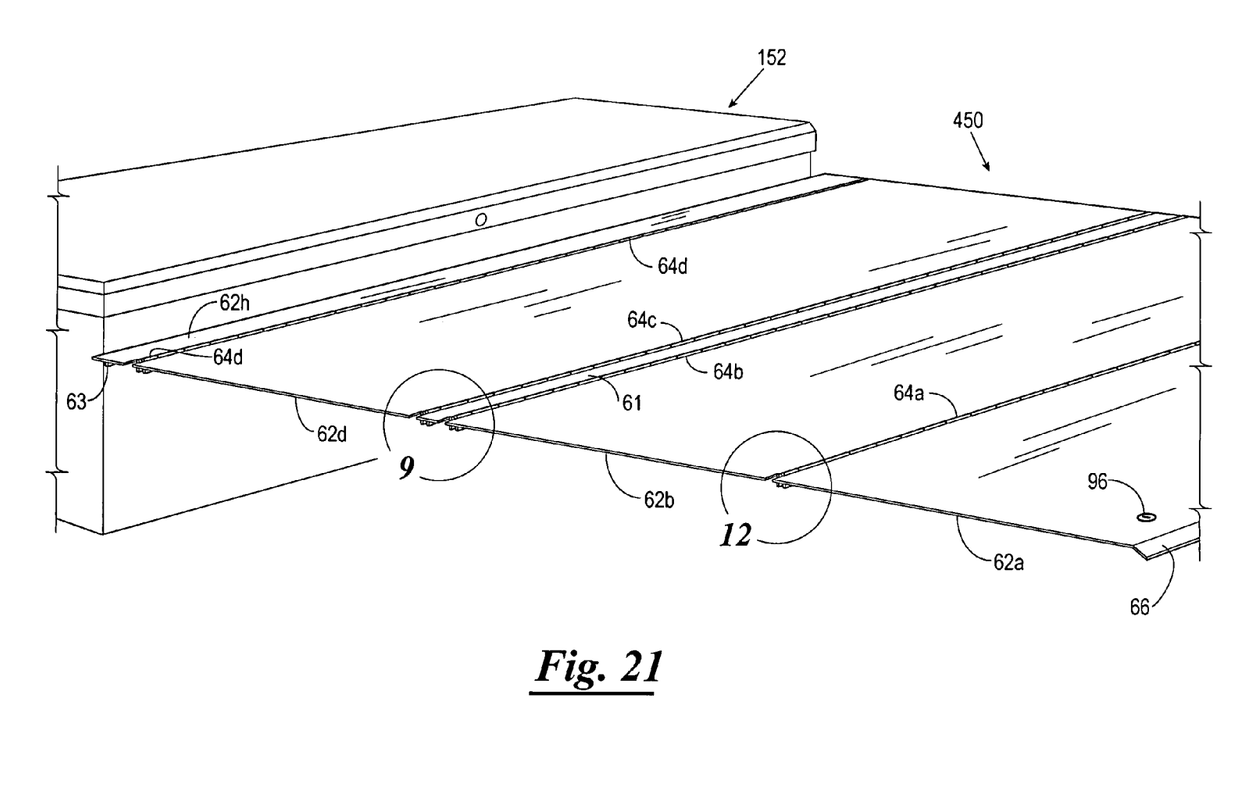
FIG. 21 is an another view of the pickup bed cover shown in FIGS. 18 and 19.

Now referring to FIG. 21, the rearmost rigid panel 62*a* is foldably attached to the rigid panel 62*b* by the hinge 64*a*. The rigid panel 62*b* is foldably attached to the relatively narrower rigid panel 61 by the hinge 64*b*. The relatively narrower rigid panel 61 is foldably attached to the rigid panel 62*d* by the hinge 64*c*. The rigid panel 62*d* is foldably attached to the frontmost rigid panel 62*h* by the hinge 64*d* (See FIGS. 9 and 12). The frontmost rigid panel 62*h* includes a substantially vertical lip 63. Bores 83 in the substantially vertical lip 63 of the frontmost rigid panel 62*h* permit attachment of the frontmost rigid panel 62*h* to the toolbox 152 (See FIG. 20). A rotary lock 96 secures each corner of the rearmost rigid panel 62*a* to the rear stake pocket in each side rail 70.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cover for a bed of a long-bed pickup truck having the bed with a pair of generally parallel, spaced-apart, upstanding sidewalls, a tailgate extending between the sidewalls at the rear, a front wall extending between the sidewalls at an end opposite the tailgate adjacent a cab of the pickup, the sidewalls, tailgate, and front wall defining the pickup truck bed, wherein a tool box having a front sidewall and a substantially vertical rear sidewall is mounted adjacent the front wall of the bed, the pickup bed cover comprising:

a frontmost rigid panel attached to the substantially vertical rear sidewall of the tool box;

a first intermediate rigid panel attached to said frontmost rigid panel by a first transverse hinge;

a relatively narrower rigid panel attached to said first intermediate rigid panel by a second transverse hinge;

a second intermediate rigid panel attached to said relatively narrower rigid panel by a third transverse hinge;

a rear rigid panel attached to said second intermediate rigid panel by a fourth transverse hinge, said rear rigid panel having a tailgate locking lip flaring downwardly and outwardly to prevent the tailgate from opening; and wherein said frontmost rigid panel, said first intermediate rigid panel, said relatively narrower rigid panel, said second intermediate rigid panel, and said rear rigid panel cooperate to cover the pickup bed in a fully covering position, wherein said rear rigid panel folds across said second intermediate rigid panel at said fourth transverse hinge so that said tailgate locking lip of said rear rigid panel rests against said second intermediate rigid panel to cover the pickup bed partially in a partially covering position, and wherein said second intermediate rigid panel, said relatively narrower rigid panel, and said rear rigid panel, remaining folded across said second intermediate rigid panel, fold across said first intermediate rigid panel along said third transverse hinge and said second transverse hinge so that said second intermediate rigid panel rests against said first intermediate rigid panel to cover the pickup bed partially in a second partially covering position, and wherein said rear rigid panel, said second intermediate rigid panel, said relatively narrower rigid panel, and said first intermediate rigid panel, folded together, then fold upward along said first transverse hinge so that said folded panels reside in an essentially vertical position in an open position.

2. The device of claim 1 wherein said frontmost rigid panel, said first intermediate rigid panel, said second intermediate rigid panel, said relatively narrower rigid panel, and said rear rigid panel have lateral extensions which extend outwardly across the sidewalls of the pickup bed and thereby support said rigid panels on the sidewalls.

3. The device of claim 2, further comprising lateral extension seals disposed between each said lateral extension of said rigid panels and the respective sidewall of the pickup bed.

4. The device of claim 1, wherein each said transverse hinge is a piano hinge.

5. The device of claim 4 wherein adjacent ones of said rigid panels have mating downwardly-directed transverse lips.

* * * * *